(12) United States Patent
Press (10) Patent No.: US 8,162,335 B1
(45) Date of Patent: Apr. 24, 2012

(54) RAISED AXLE AND SUSPENSION SYSTEM

(76) Inventor: Richard U. Press, El Cajon, CA (US)

( * ) Notice: Subject to any disclaimer, the term of this patent is extended or adjusted under 35 U.S.C. 154(b) by 0 days.

(21) Appl. No.: 13/301,579

(22) Filed: Nov. 21, 2011

(51) Int. Cl.
*B60G 3/12* (2006.01)
*B60G 3/14* (2006.01)

(52) U.S. Cl. ............ 280/124.128; 280/6.151; 280/6.152

(58) Field of Classification Search ................. 280/6.15, 280/6.151, 6.152, 124.1, 124.116, 124.128; 414/921
See application file for complete search history.

(56) References Cited

U.S. PATENT DOCUMENTS

| | | | | |
|---|---|---|---|---|
| 2,299,926 | A * | 10/1942 | Phelps | 280/788 |
| 4,039,205 | A * | 8/1977 | Castanier | 280/124.109 |
| 4,232,881 | A * | 11/1980 | Kolbel et al. | 280/124.128 |
| 4,234,205 | A * | 11/1980 | Thiesce | 280/124.107 |
| 4,461,609 | A * | 7/1984 | Zinno | 414/495 |
| 4,934,733 | A * | 6/1990 | Smith et al. | 280/124.132 |
| 5,275,430 | A * | 1/1994 | Smith | 280/6.151 |
| 5,597,172 | A * | 1/1997 | Maiwald et al. | 280/124.153 |
| 6,098,995 | A * | 8/2000 | Danis | 280/6.152 |
| 7,108,271 | B2 * | 9/2006 | Smith | 280/124.128 |
| 7,419,024 | B1 * | 9/2008 | Tavantzis | 180/210 |
| 7,556,111 | B2 * | 7/2009 | Oshidari | 180/65.51 |
| 7,823,674 | B2 * | 11/2010 | Bowles et al. | 180/210 |
| 8,042,817 | B2 * | 10/2011 | Motebennur et al. | 280/5.514 |

* cited by examiner

*Primary Examiner* — Joseph Rocca
(74) *Attorney, Agent, or Firm* — Richard D. Clarke (57) ABSTRACT

The present invention is directed to a Raised Axle and Suspension System that consists of a unique design that is intended to be used on a wide variety of front wheel drive vehicles and trailers by raising the axle overarm to an overhead position. This is accomplished by having the wheels on stub axles attached to a pivoting wheel support castings that are attached to frame attachment members. Angular support members are fixably attached to the frame attachment members and suspension support members that connect to the axle overarm. The axle overarm extends from the left side of the vehicle to the right side. The suspension springs extend between the suspension base members that are pivotally connected to the wheel support castings and the suspension support members along with conventional shock absorbers creating a spring cushioning system.

18 Claims, 6 Drawing Sheets

RAISED AXLE AND SUSPENSION SYSTEM

FIELD OF THE INVENTION

This application is in the field of lowering the floor level for a wide variety of motor vehicles and trailers by raising the rear axle overarm to an overhead position and mounting the wheels on a suspension system using individual stub axles.

BACKGROUND OF THE INVENTION

This invention describes a new and unique design that raises the axle height of a wide range of vehicles including cars and minivans, delivery vans, handicapped vans, busses, campers and trailers to provide a curb level floor surface. The intended use of the overhead axle is for front wheel drive vehicles only or trailers. The axle consists of the rigid structure that connects two or more rear wheels of a motor vehicle or the two or more wheels of a trailer. The axle overarm is actually an extension of the vehicle frame and is connected to the unitized construction of the vehicle body.

This is accomplished by having the rear axle structure above head height within these vehicles. On conventional vehicles with the floor above the rear axle and suspension system it creates an elevated floor height where individuals are required to climb up to enter the vehicle. This is extremely difficult for delivery people who have to re-enter the vehicle a great number of times a day. Additional problems occur with handicapped individuals entering vehicles either by themselves, with help or in wheelchairs. Wheel chair lifts are very expensive to be incorporated into a vehicle where they are required to lift the handicapped individual up to the floor height of the vehicle. Most public vehicles are required to have wheelchair lifts for the handicapped which are expensive and take up a lot of space. On commercial vehicles it takes a lot more time assisting a handicapped person into and out of the vehicle than the other passengers which can greatly affect the scheduled time of these operations. Electric wheelchairs are most often carried on a special lift on the rear of private vehicles due to their weight. For recreational vehicles the Raised Axle and Suspension System produces a unique conveyance and the ability for elderly individuals to enter easily.

The overhead axle eliminates the need for a bulky frame going over the conventional axle below the floor between the two rear wheels of the vehicle. The main body strength of the Raised Axle and Suspension System comes from the overhead axle overarm, overhead chassis and unitized construction of the body. As a result, the entire floor may be only three inches thick, and ten inches from the ground.

Numerous innovations for various vehicles have been provided in the prior art that are described as follows. Even though these innovations may be suitable for the specific individual purposes to which they address, they differ from the present design as hereinafter contrasted. The following is a summary of those prior art patents most relevant to this application at hand, as well a description outlining the difference between the features of the Raised Axle and Suspension System and the prior art.

U.S. Pat. No. 4,039,205 of Emile Lucien Castanier describes a rear-end suspension for an automotive vehicle comprising a rigid cross-member mounted by means of resilient bearing assemblies on the vehicle frame or body. At each side of the vehicle is provided a substantially triangular wheel arm pivoted at two vertices of the triangle to the cross-member, the third vertex carrying the spindle on which the wheel is mounted. In view to limit the longitudinal displacements of the ends of the cross-member, each of said ends is mounted on the vehicle frame by means of two directional bearing assemblies the directional axes of which intersect substantially on the axis of the cross-member.

This patent describes a rear-end suspension for an automotive vehicle comprising a rigid cross-member mounted by means of resilient bearing assemblies on the vehicle frame or body. This patent design still has the floor of the vehicle above the axle and could not be used for transporting handicapped people, and does not facilitate a walk-about interior.

U.S. Pat. No. 4,232,881 of Kolbel; Hans J. et al describes a vehicle suspension, wherein the wheels are mounted to bending and torsion resistant longitudinal control arms, is provided with a cross-strut with a U-shaped or V-shaped cross-section mounted between the control arms and gusset plates for strengthening the connection between the cross-strut and the control arms. A transverse corrugation is provided on the cross-strut in the vicinity of the end of the gusset plate, for strengthening the cross-strut in the vicinity of its largest discontinuity in rigidity and thereby increasing its overall strength.

This patent describes a vehicle suspension, wherein the wheels are mounted to bending and torsion resistant longitudinal control arms. This patent design still has the floor of the vehicle above the axle and could not be used for transporting handicapped people, and does not facilitate a walk-about interior.

U.S. Pat. No. 4,234,205 of Thiesce; Pierre describes an invention that relates to a suspension for a set of wheels of a vehicle, in which the wheels are rotatably carried by the end of an axle arm of which the hub is mounted to rotate at the end of a cross member fast with the structure of the vehicle. According to the invention, the suspension is constituted by two torsion bars coupled for each of them between one of the arms and an element fast with the structure. Each torsion bar extends parallel to the axis of the hub and to the exterior thereof, and is immobilized in rotation by one of its ends on the corresponding arm and by the other of its ends on the element which is located in the vicinity of the other arm. The hub of each of the arms is movable in translation along its axis with respect to the cross member. The invention finds particular application to the automobile industry.

This patent describes an invention that relates to a suspension for a set of wheels of a vehicle, in which the wheels are rotatably carried by the end of an axle arm. These patents have been designed for industrial or farm vehicles and have the floor of the vehicle above the axle.

U.S. Pat. No. 8,042,817 of Vijay W. Motebennur describes a self-propelled, dirigible agricultural vehicle that includes a height-adjustable chassis with an axle and a driven wheel hub. The axle is shiftable between a normal clearance position above the wheel hub and a relatively higher elevated clearance position. The chassis further includes a kingpin and a spacer section that is removably connectable to the kingpin. The axle is in the normal clearance position when the spacer is removed from the kingpin and is in the elevated clearance position when the spacer is connected to the kingpin.

This patent describes a self-propelled, dirigible agricultural vehicle that includes a height-adjustable chassis with an axle but does not describe an axle that can be used on passenger vehicles.

None of these previous efforts, however, provides the benefits attendant with the Raised Axle and Suspension System. The present design achieves its intended purposes, objects and advantages over the prior art devices through a new, useful and unobvious combination of method steps and component elements, with the use of a minimum number of functioning parts, at a reasonable cost to manufacture, and by employing readily available materials.

SUMMARY OF THE INVENTION

The principal advantage of the Raised Axle and Suspension System is the capability of lowering the floor height of a wide variety of vehicles.

Another advantage of the Raised Axle and Suspension System is having the floor of vehicles close to the height of a curb.

Another advantage of the Raised Axle and Suspension System is that with the aid of a small ramp a wheelchair can enter a vehicle easily, and can be driven by a person while seated in their wheelchair.

Another advantage of the Raised Axle and Suspension System is that with the lower floor level delivery people do not have to climb up and down every time they make a delivery.

Another advantage of the Raised Axle and Suspension System is that when loading and unloading large items for delivery, they can be rolled in and out of the cargo area very easily on small ramps.

Another advantage of the Raised Axle and Suspension System is that delivery vehicles would not require lifting tailgates.

Another advantage of the Raised Axle and Suspension System is that openings can be at the rear or sides of the vehicle at a curb height.

Another advantage of the Raised Axle and Suspension System is that commercial passenger vehicles would avoid the expense of installing an expensive wheelchair lifting elevator.

Another advantage of the Raised Axle and Suspension System is that it eliminates the conventional frame of the vehicle going over the top of the axle.

And still another advantage is to create a vehicle with a lower center of gravity.

Yet another advantage of the Raised Axle and Suspension System is that the raised axle creates a roll bar at the rear of the vehicle.

A further advantage is to create a vehicle with a lower overall height where vans and RV's are able to fit into private home garages while maintaining a taller entry height and a walk-about interior with a greater ceiling height.

And yet a further advantage of the Raised Axle and Suspension System is being able to create trailers having a lower floor, lower overall height and reduced weight, or a vehicle or trailer with no floor capable of straddling a cargo load for pick-up and delivery.

In this respect, before explaining at least one embodiment of the Raised Axle and Suspension System in detail it is to be understood that the design is not limited in its application to the details of construction and to the arrangement, of the components set forth in the following description or illustrated in the drawings. The Raised Axle and Suspension System is capable of other embodiments and of being practiced and carried out in various ways. In addition, it is to be understood that the phraseology and terminology employed herein are for the purpose of description and should not be regarded as limiting. As such, those skilled in the art will appreciate that the conception, upon which this disclosure is based, may readily be utilized as a basis for designing of other structures, methods and systems for carrying out the several purposes of the present design application. It is important, therefore, that the claims be regarded as including such equivalent construction insofar as they do not depart from the spirit and scope of the present application.

The Raised Axle and Suspension System consists of a unique design that is intended to be used on front wheel drive cars, minivans, delivery vans, handicapped vans, busses, campers and trailers by raising the axle overarm to an overhead position. This is accomplished by having the wheels on stub axles attached to a pivoting wheel support castings that are connected to frame attachment members. Angular support members are fixably attached to the frame attachment members and suspension support members that connect to the axle overarm. The axle overarm extends from the left side of the vehicle to the right side creating an extension of the frame of the vehicle to the elevated position that will tie into the unitized construction of the vehicle body. As a result, the entire floor may be only three inches thick and ten inches from the ground. The suspension springs extend between the suspension base members. The base members are pivotally connected to the wheel support castings, and the suspension support members. This structure, along with conventional shock absorbers, create a spring cushioning suspension system.

The foregoing has outlined rather broadly the more pertinent and important features of the present Raised Axle and Suspension System in order that the detailed description of the application that follows may be better understood so that the present contribution to the art may be more fully appreciated. Additional features of the design will be described hereinafter which form the subject of the claims of this disclosure. It should be appreciated by those skilled in the art that the conception and the disclosed specific embodiment may be readily utilized as a basis for modifying or designing other structures and methods for carrying out the same purposes of the present design. It should also be realized by those skilled in the art that such equivalent constructions and methods do not depart from the spirit and scope of this application as set forth in the appended claims.

BRIEF DESCRIPTION OF THE DRAWINGS

The accompanying drawings, which are incorporated in and form a part of this specification, illustrate embodiments of the Raised Axle and Suspension System and together with the detailed description, serve to explain the principles of this application.

For a fuller understanding of the nature and advantages of the Raised Axle and Suspension System, reference should be had to the following detailed description taken in conjunction with the accompanying drawings which are incorporated in and form a part of this specification, illustrate embodiments of the design and together with the description, serve to explain the principles of this application.

DETAILED DESCRIPTION OF THE PREFERRED EMBODIMENTS

Figure 1:
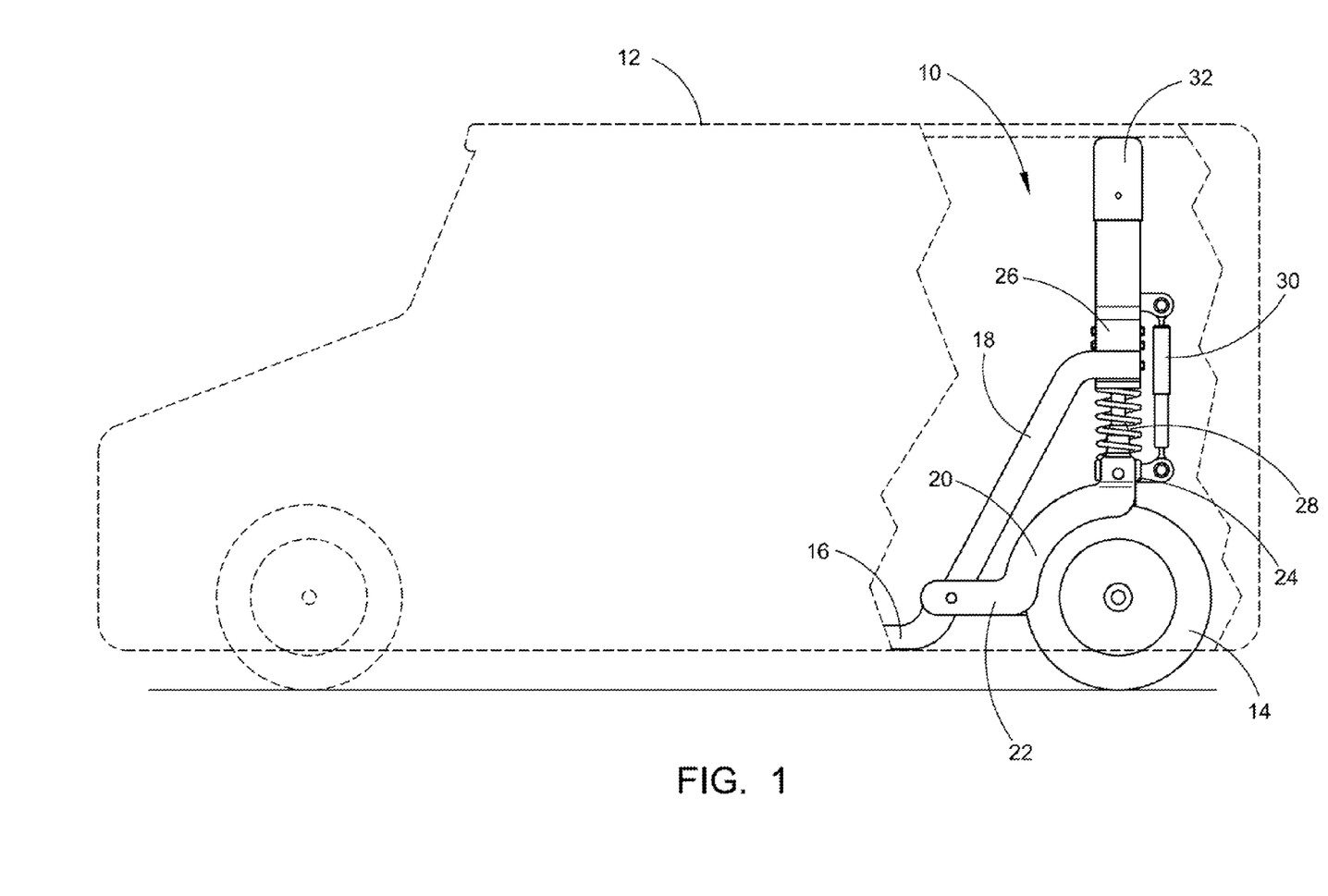
FIG. 1 depicts a side view of a conventional front wheel drive vehicle incorporating the Raised Axle and Suspension System mechanism.

Referring now to the drawings, wherein similar parts of the preferred embodiment of the Raised Axle and Suspension System 10 are identified by like reference numerals, there is seen in FIG. 1 a side view of a conventional front wheel drive vehicle 12 incorporating the Raised Axle and Suspension System 10. The right side of the preferred Raised Axle and Suspension System 10 is a mirror image of the left side. This view illustrates the vehicles left side wheel 14, the frame attachment member 16 that is welded to the angular support member 18. The wheel side support member 20 of the wheel support casting 22 that is pivotally connected to the suspension base member 24 and the suspension support member 26 that is additionally welded to the angular support member 18. The suspension spring 28 extends between the suspension base member 24 and the suspension support member 26 along with a conventional shock absorber 30. The axle overarm 32 extends from the left side of the vehicle to the right side.

Figures 2, 3:
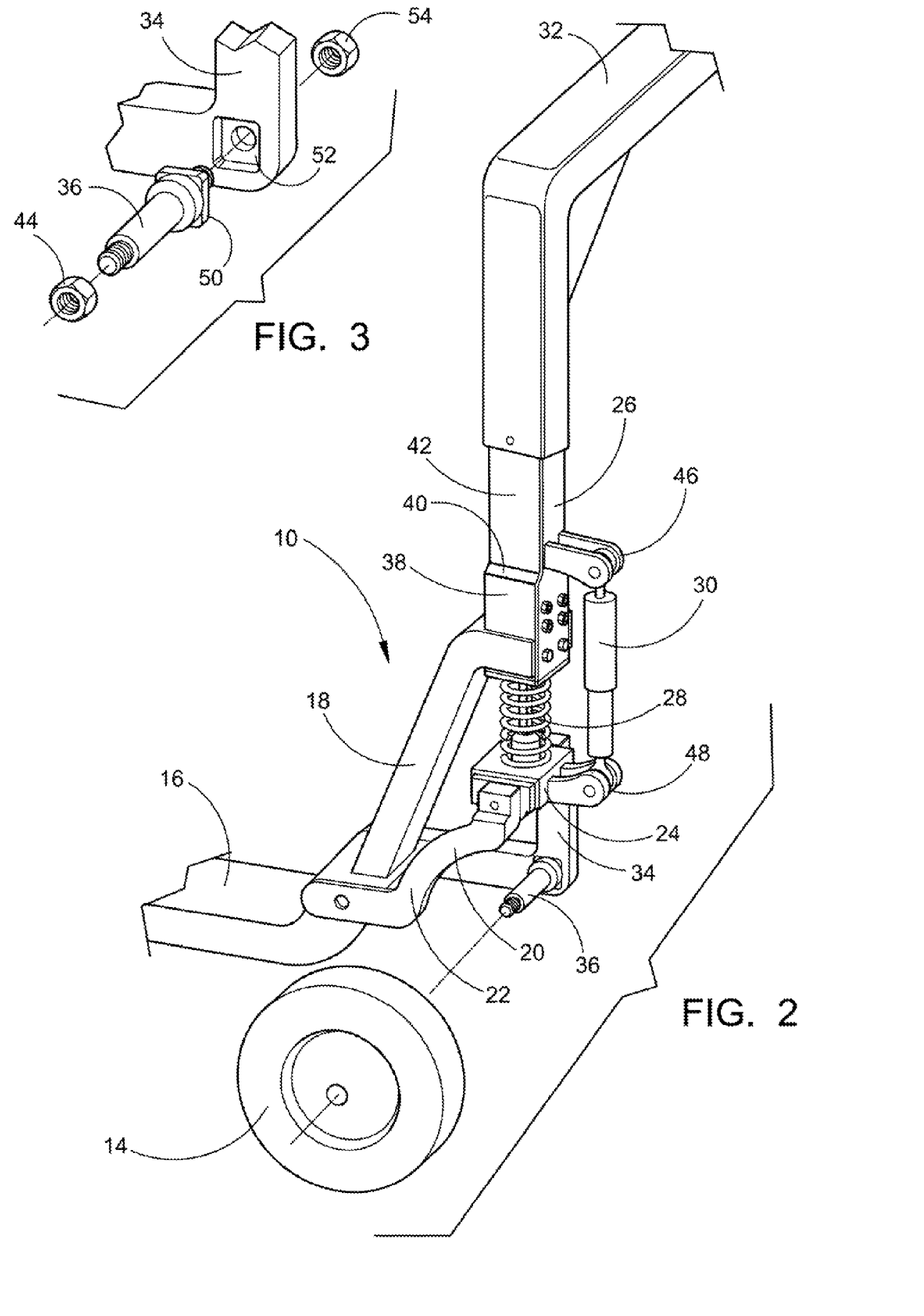
FIG. 2 depicts an assembled perspective view of the Raised Axle and Suspension System with the wheel exploded away.
FIG. 3 depicts a perspective exploded view of the left side support mechanism of the wheel support casting illustrating the stub axle.

FIG. 2 depicts an assembled perspective view of the Raised Axle and Suspension System 10 with the wheel 14 exploded away. The frame attachment member 16 that is connected to the angular support member 18 is pivotally attached to the wheel support casting 22 having the wheel side support member 20 and the wheel attachment member 34 with the stub axle 36. The angular support member 18 is welded to the square cross section 38 of the suspension support member 26. At the transition section 40 the suspension support member 26 changes from a square cross section 38 to the rectangular cross section 42. The shock absorber 30 is attached to the rectangular cross section 42 by the means of the clevis pin 46 and to the suspension base member by the means of the clevis pin 48.

FIG. 3 depicts a perspective exploded view of the wheel attach member 34 illustrating the stub axle 36 having a tapered square section 50 which will engage with the tapered square orifice 52 in the wheel attachment member 34 to be locked in place by the means of the stub axle lock nut 54. The wheel 14 will be attached to the stub axle 36 by the means of the wheel nut 44.

Figure 4:
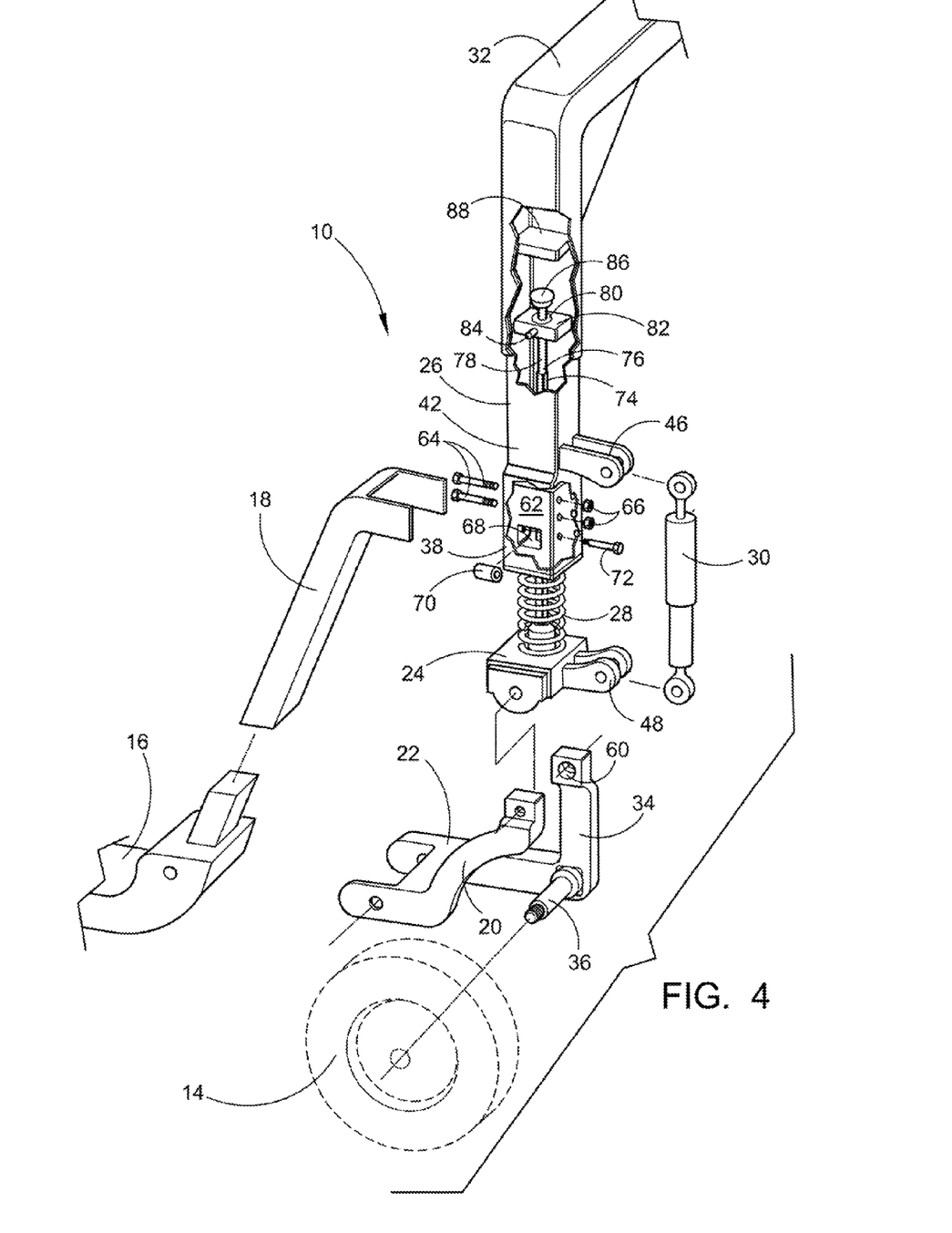
FIG. 4 depicts an exploded perspective view of the left side mechanism of the Raised Axle and Suspension System.

FIG. 4 depicts an exploded perspective view of the left side mechanism of the Raised Axle and Suspension System 10. The frame attachment member 16 is moved away from the tubular angular support member 18 where it is fixably attached. The wheel support casting 22 is shown with the side support member 20 and the wheel attachment member 34 with the stub axle 36 and a bearing pocket 60 which will also be located in side support member 20. A square bearing block 62 will be attached within the square cross section 38 of the suspension support member 26 by the means of four bolts 64 and nuts 66. Bearing pockets 68 on both sides of the bearing block 62 will house the roller bearings 70 that will rotate on the shoulder bolts 72. The reason for the roller bearings 70 is to facilitate a flat surface contact with the square section 74 of the central shaft 76 that moves forward and backward along with up and down in the motion of the wheel 14 on the wheel support casting 22. An upper section of the suspension support member 26 in the rectangular cross section 42 has been broken away to expose the square section 74 of the central shaft 76 that changes to a round cross section 78. The reason that the central shaft changes from the square section 74 to the round cross section 78 is the round section 78 goes through the bushing 80 in the pivot block 82 that pivot on pivot pins 84. The pivot block 82 pivots slightly with the up and down motion of the wheel 14 and the wheel support member 20. A rubber bumper 86 is attached to the end of the central shaft 76 to bottom out against the fixed stop plate 88.

Figure 5:
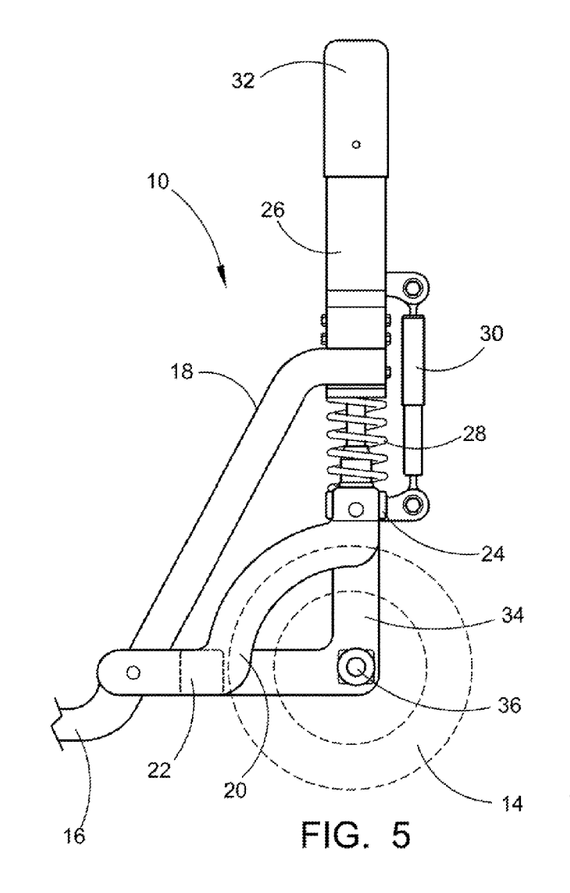
FIG. 5 depicts a left side view of the Raised Axle and Suspension System.

FIG. 5 depicts a side view of the Raised Axle and Suspension System 10. This view illustrates the vehicles left side wheel 14, the frame attachment member 16 that is welded to the angular support member 18. The wheel side support member 20 of the wheel support casting 22 is pivotally connected to the suspension base member 24 and the suspension support member 26. The wheel 14 is shown in phantom to illustrate the location of the wheel attachment member 34 and the stub axle 36. The suspension spring 28 extends between the suspension base member 24 and the lower suspension support 26 along with a conventional shock absorber 30. The axle overarm 32 extends from the left side of the vehicle to the right side.

Figure 6:
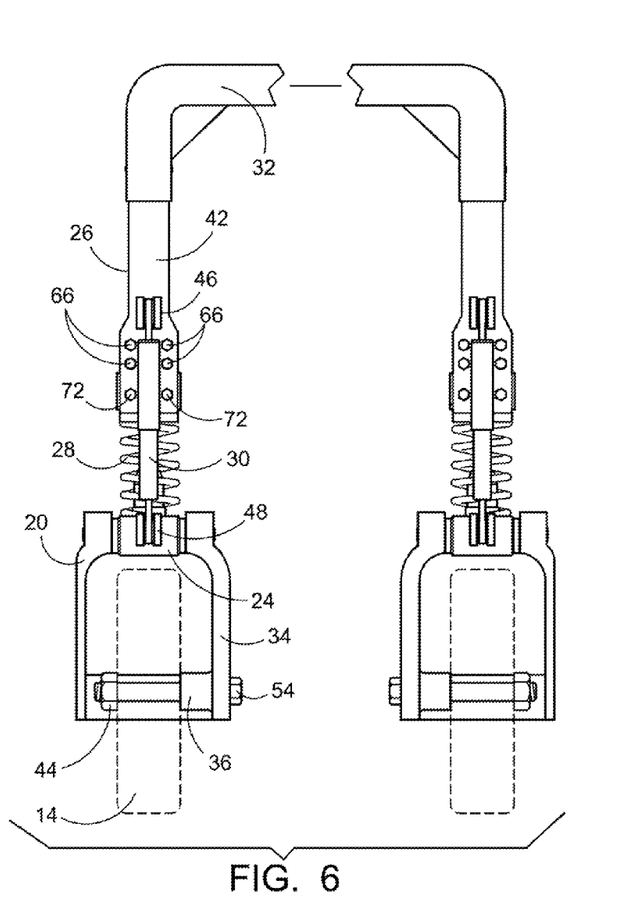
FIG. 6 depicts a rear view of the left and right side of the Raised Axle and Suspension System.

FIG. 6 depicts a rear view illustrating the relationship of the left and right side of the Raised Axle and Suspension System 10 and the positioning of the shock absorber 30. It is also anticipated that a vehicle or trailer with no floor capable of straddling a cargo load for pick-up and delivery may be configured using the present invention.

Figure 7:
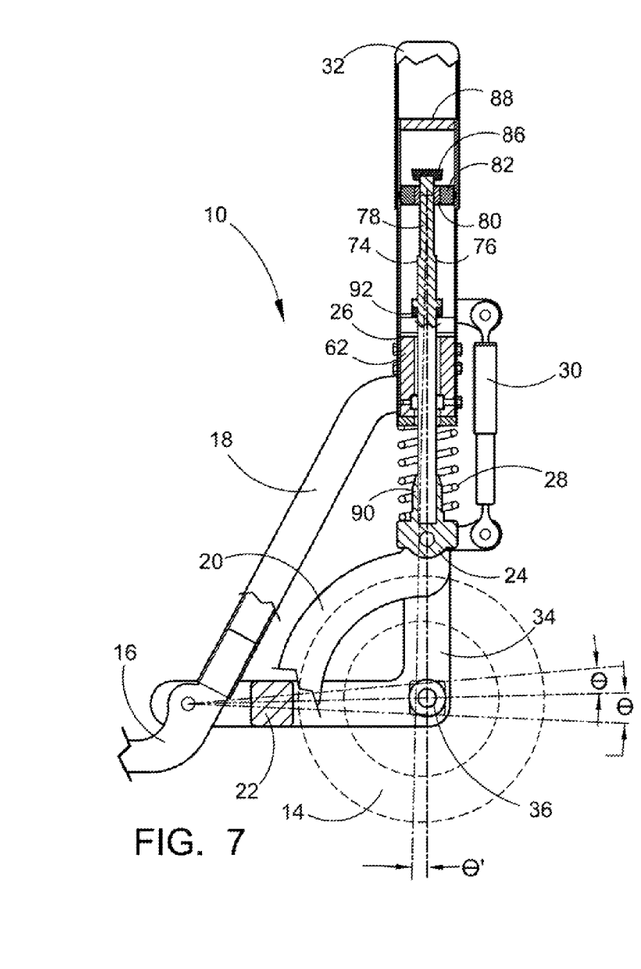
FIG. 7 depicts a cross section of the left side view of the Raised Axle and Suspension System.

FIG. 7 depicts a cross section of the left side view of the Raised Axle and Suspension System 10 illustrating the vehicles left side wheel 14 in phantom to depict the angular movement up and down θ and the angular movement back and forth θ' of the wheel 14 and the stub axle 36. The central shaft 76 pivots on the upper end in the pivot block 82 moving up and down through the bushing 80. The wheel side support member 20 of the wheel support casting 22 is pivotally connected to the suspension base member 24 and the suspension support member 26. A spring guide 90 is the upper part of the suspension base member 24 and centers the suspension spring 28 under the bearing block 62. A rubber cushion 92 attached to the central shaft 76 on the square section 74 will come against the bearing block 62 when the weight of the vehicle 12 is removed from the wheel 14.

Figure 8:
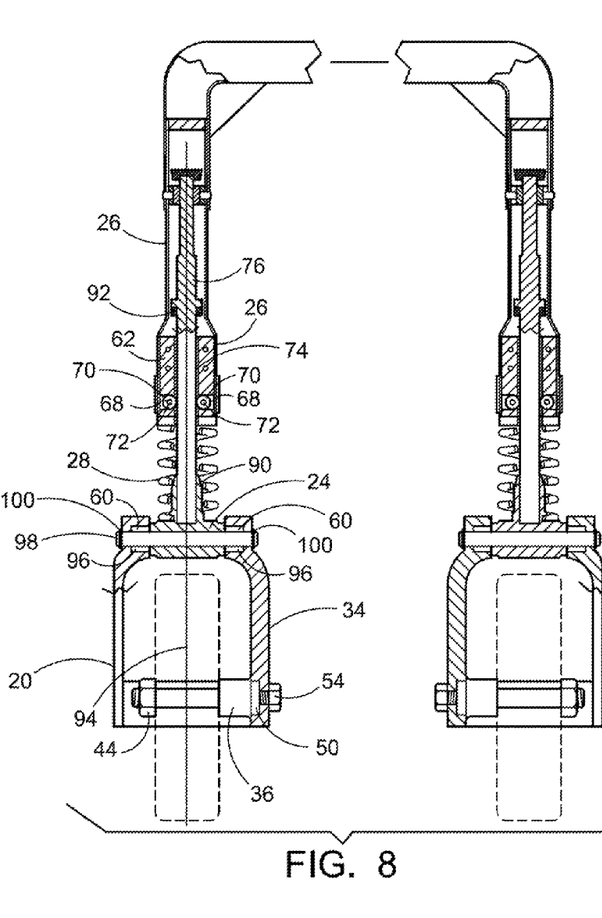
FIG. 8 depicts a cross section of the left and right side of the Raised Axle and Suspension System.

FIG. 8 depicts a cross section of the left and right side of the Raised Axle and Suspension System 10 illustrating the centralized alignment along the centerline 94 of the wheel 14, the suspension base member 24, and the central shaft 76. The two roller bearings 70 in the bearing pockets 68 in the bearing block 62 rotating on the shoulder bolts 72 are on each side of the square section 74 of the central shaft 76. The two sides of the wheel support casting 22, consisting of the wheel side support member 20 and the wheel attachment member 34 with bearing pockets 60 and bearings 96 retain the suspension base member 24. The wheel support casting 22 pivots on the pivot shaft 98 that is held at both ends by the means of snap rings 100. The two roller bearings 70 provide for allowing up and down and forward and backward movement, while also restricting lateral movement.

Figure 9:
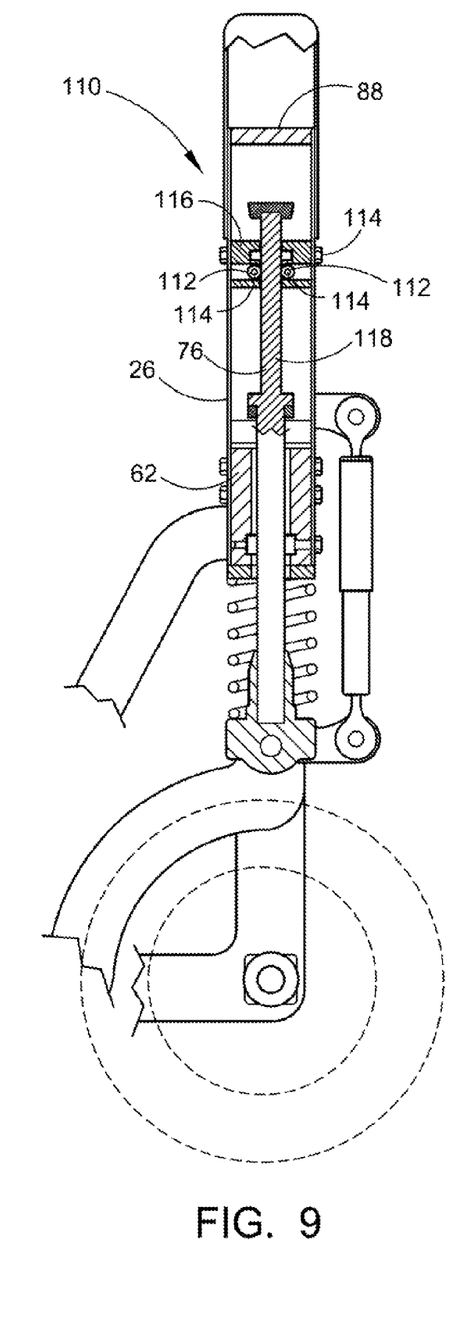
FIG. 9 depicts a cross section of the left side view of the alternate embodiment of the Raised Axle and Suspension System.

FIG. 9 depicts a cross section of the left side view of the alternate embodiment of the Raised Axle and Suspension System 110 where a pair of roller bearings 112 rotating on shoulder bolts 114 are housed in a second bearing block 116 and allow the central shaft 76 to pivot forward and backward and move up and down. The upper section 118 of the central shaft 76 in this embody will have a square cross section instead of the round section of the preferred embodiment of the Raised Axle and Suspension System 10.

Figure 10:
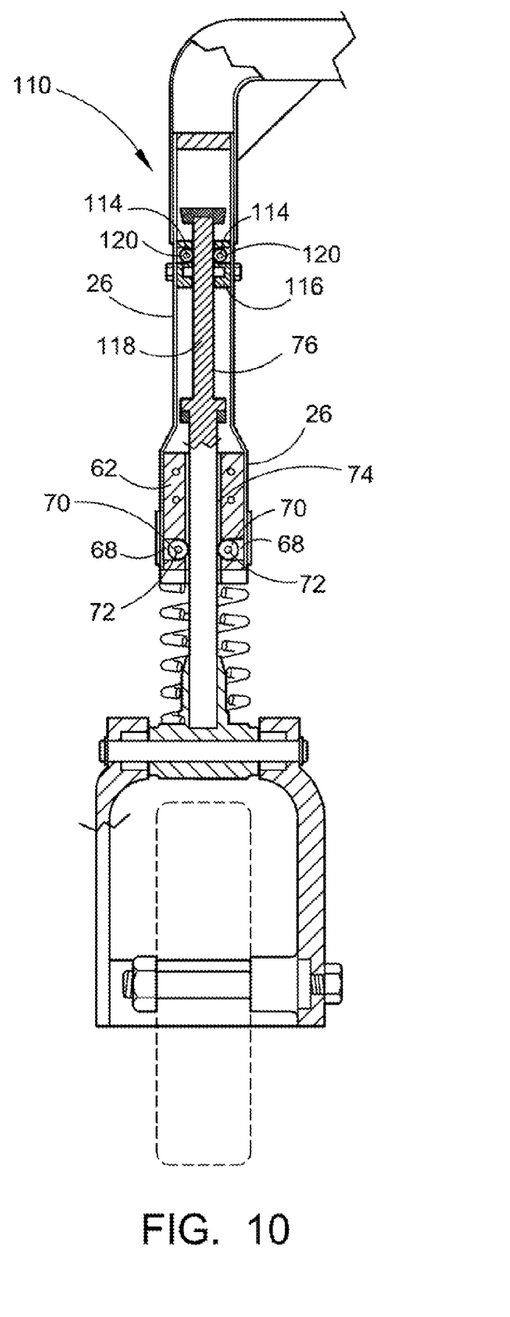
FIG. 10 depicts a cross section of the left and right side of the alternate embodiment of the Raised Axle and Suspension System.

FIG. 8 depicts a cross section of the left and right side of the alternate embodiment of the Raised Axle and Suspension System 110 depicting a second pair of roller bearings 120 rotating on shoulder bolts 114 are housed in a second bearing block 116 allowing the central shaft 76 to move up and down. The position of the roller bearings 70 in the bearing block 62 will eliminate any side movement of the central shaft 76. The unique use of the roller bearings 70, 112 and 120 against a square central shaft 76 allow for a smooth movement up and down and the pivoting forward and backward while providing a solid resistance against any sideways movement. It is also anticipated that a conventional disc breaking system will be adapted to the standard wheel rim and the wheel attachment member 34.

The Raised Axle and Suspension System 10 shown in the drawings and described in detail herein disclose arrangements of elements of particular construction and configuration for illustrating preferred embodiments of structure and method of operation of the present application. It is to be understood, however, that elements of different construction and configuration and other arrangements thereof, other than those illustrated and described may be employed for providing a Raised Axle and Suspension System 10 in accordance with the spirit of this disclosure, and such changes, alternations and modifications as would occur to those skilled in the art are considered to be within the scope of this design as broadly defined in the appended claims.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

I claim:

1. A raised axle and suspension system comprising:
   (a) a frame attachment member affixed to an angular support member;
   (b) a suspension base member and a suspension support member affixed to said angular support member;
   (c) a wheel support casting having a wheel side support member wherein said wheel support casting is pivotally connected to said suspension base member and said suspension support member;
   (d) a suspension spring extending between said suspension base member and said suspension support member;
   (e) a shock absorber affixed to said suspension support member and said suspension base member; and
   (g) further wherein said suspension support member on one side of the vehicle extends upward and into a U-shaped axle overarm.

2. The raised axle and suspension system according to claim 1, wherein said U-shaped axle overarm extends downward and into said suspension support member on the opposite side of the vehicle.

3. The raised axle and suspension system according to claim 1, wherein said wheel support member includes a wheel attachment member having a stub axle for securing the vehicle wheel.

4. The raised axle and suspension system according to claim 1, wherein said wheel support casting is pivotally connected to said suspension base member and said suspension support member includes a central shaft, a pivot block, and a bushing wherein said central shaft pivots on the upper end in said pivot block moving up and down through said bushing.

5. The raised axle and suspension system according to claim 4, including a spring guide, a bearing block and a rubber cushion, wherein a spring guide is located in the upper part of said suspension base member and acts to center said suspension spring under said bearing block.

6. The raised axle and suspension system according to claim 5, wherein said rubber cushion is attached to said central shaft will come against the bearing block when the weight of the vehicle is removed from the wheel.

7. The raised axle and suspension system according to claim 1, wherein a pair of roller bearings located in a bearing block within said suspension support member which act to allow up and down and forward and backward movement, while also restricting lateral movement.

8. The raised axle and suspension system according to claim 7, including a second pair of roller bearings which are housed in a second bearing block wherein said second pair of roller bearings rotate on shoulder bolts allowing said central shaft to move up and down and at the same time the position of the roller bearings in the bearing block eliminates any side movement of the central shaft.

9. The raised axle and suspension system according to claim 1, wherein said shock absorber affixed to said suspension support member and said suspension base member is a conventional shock absorber.

10. A method for making a raised axle and suspension system comprising the steps of:
    (a) providing a frame attachment member welded to an angular support member;
    (b) providing a suspension base member and a suspension support member welded to said angular support member;
    (c) providing a wheel support casting having a wheel side support member wherein said wheel support casting is pivotally connected to said suspension base member and said suspension support member;
    (d) providing a suspension spring extending between said suspension base member and said suspension support member;
    (e) providing a conventional shock absorber affixed to said suspension support member and said suspension base member; and
    (g) further wherein said suspension support member on one side of the vehicle extends upward and into a U-shaped axle overarm.

11. The method for making a raised axle and suspension system according to claim 10, wherein said U-shaped axle overarm extends downward and into said suspension support member on the opposite side of the vehicle.

12. The method for making a raised axle and suspension system according to claim 10, wherein said wheel support member includes a wheel attachment member having a stub axle for securing the vehicle wheel.

13. The method for making a raised axle and suspension system according to claim 10, wherein said wheel support casting is pivotally connected to said suspension base member and said suspension support member includes a central shaft, a pivot block, and a bushing wherein said central shaft pivots on the upper end in said pivot block moving up and down through said bushing.

14. The method for making a raised axle and suspension system according to claim 13, including a spring guide, a bearing block and a rubber cushion, wherein a spring guide is located in the upper part of said suspension base member and acts to center said suspension spring under said bearing block.

15. The method for making a raised axle and suspension system according to claim 14, wherein said rubber cushion is attached to said central shaft will come against the bearing block when the weight of the vehicle is removed from the wheel.

16. The method for making a raised axle and suspension system according to claim 10, wherein a pair of roller bearings located in a bearing block within said suspension support member which act to allow up and down and forward and backward movement, while also restricting lateral movement.

17. The method for making a raised axle and suspension system according to claim 16, including a second pair of roller bearings which are housed in a second bearing block wherein said second pair of roller bearings rotate on shoulder bolts allowing said central shaft to move up and down and at the same time the position of the roller bearings in the bearing block eliminates any side movement of the central shaft.

18. The method for making a raised axle and suspension system according to claim 10, wherein said shock absorber affixed to said suspension support member and said suspension base member is a conventional shock absorber.

* * * * *